Jan. 20, 1948. C. L. FLINDT 2,434,738
SOLE TRIMMING AND CUTTING MACHINE
Filed July 21, 1943 2 Sheets-Sheet 1

Inventor:
Charles L. Flindt

Jan. 20, 1948.     C. L. FLINDT     2,434,738
SOLE TRIMMING AND CUTTING MACHINE
Filed July 21, 1943     2 Sheets-Sheet 2

Inventor:
Charles L. Flindt

Patented Jan. 20, 1948

2,434,738

UNITED STATES PATENT OFFICE 2,434,738

SOLE TRIMMING AND CUTTING MACHINE

Charles L. Flindt, San Jose, Calif.

Application July 21, 1943, Serial No. 495,575

7 Claims. (Cl. 12—85)

This machine relates to machines for trimming the soles of footwear and the illustrations herein shown are as embodied in a machine particularly created for that specific purpose, however other uses have been found for this machine including jig saw work on plywood, plastics, metal and numerous other materials in sheet form.

The trimming operation upon the soles of footwear has for a great many years been performed by first, the "rough rounder," and second the "trimmer," two distinct operations being necessary in order to deliver the shoe to the "inker" who colors the sole for the final edge setting operation. In this invention improvement is added to the art of trimming shoe soles using a reciprocating trimming knife having a lateral cutting edge, with several features advancing the art of trimming by a draw stroke as distinguished from the old method contained in the standard rough rounder which operates with a chisel chopping action.

In this improvement the objects attained are first: a simple oscillating action for drawing the blade; second: mechanics producing a longer draw movement of the blade and consequently a faster cutting machine than other actions have made possible; third: a blade improved in shape and cutting qualities, and fourth: an intermittent forward movement of the blade in the cut it makes, thereby cutting faster and clearing the teeth of the blade of chips, while being supported in all positions to resist the pressure of the thrust of feeding the work against the blade.

These and other objectives will appear later in the specifications, namely, the creation of a "smooth rounder" as distinguished from the rough rounder and the elimination of one complete machine and operation now considered necessary in shoe factories.

In present day shoe making the rough edges left by the rough rounder must be smoothed up by the "trimmer."

The failure of the chopping action to produce smooth work is more particularly marked in the results on footwear having rubber or cord bottoms whereas the draw cut action especially excels in rubber work.

Figures 1, 3:
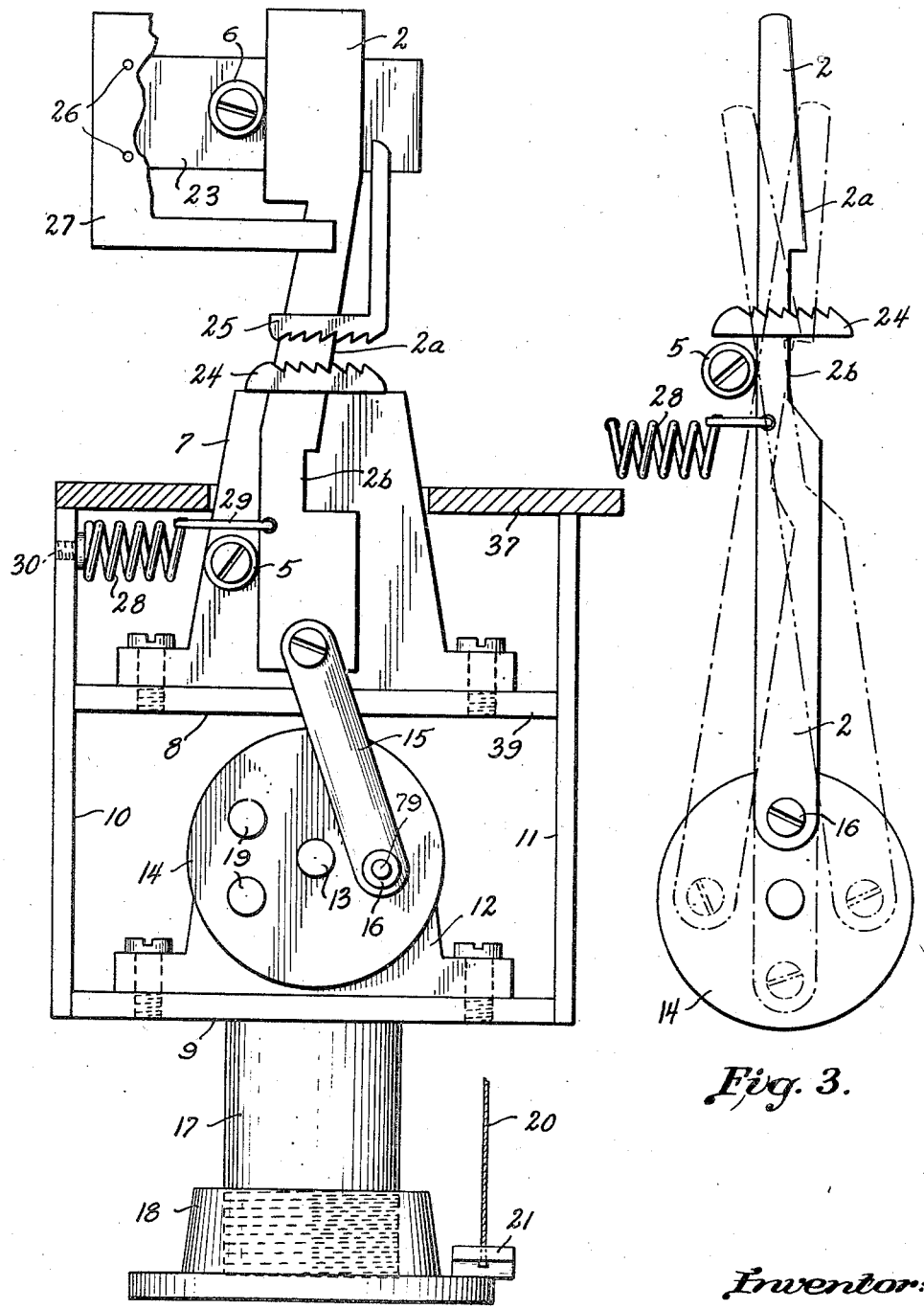
Fig. 1 is a side elevation of part of the machine.
Fig. 3 shows an alternative cutting action.

The machine has a central supporting column 17 which screws into base 18 of a height that the operating table 37 measures from the floor and can be regulated to suit the operator of the machine by the screw adjustment in the base. The top end of the column bolts to motor support 9, and uprights 10 and 11 together with floor 39 and table 37 complete the framework of the machine.

The preferred method of drive is by the direct attachment to shaft 13 of electric motor 12, Fig. 1, however at this time due to the scarcity of electric motors I provide means for taking power from the line shaft 49, Fig. 2, as follows:

A cone 46 is attached with set screws 48 to the projecting end of line shaft 49 with jack shaft 13 entering cone 46 in turning relation thereto; near its other end a bearing is provided for the jack shaft in journal arm 41 and to this shaft drive wheel 14 is attached by screw 40. The other wheel 44 which is secured on the shaft, has a leather clutch 47 secured thereto which grips the face of cone 46 when pressed against it; this is done by turning thumbnut 53 on bolt 52 enough to compress spring 54 until wheel 50 contacts the said wheel 44 with sufficient pressure to move the entire jack shaft assembly enough to close the gap between clutch 47 and cone 46 and cause engagement.

In order to disconnect the machine from the power shaft the operator merely released thumbnut 53 and then spring 43 on shaft 13 discontinues engagement of the clutch and cone; collar 42 on the shaft limits the side action.

Figures 2, 4:
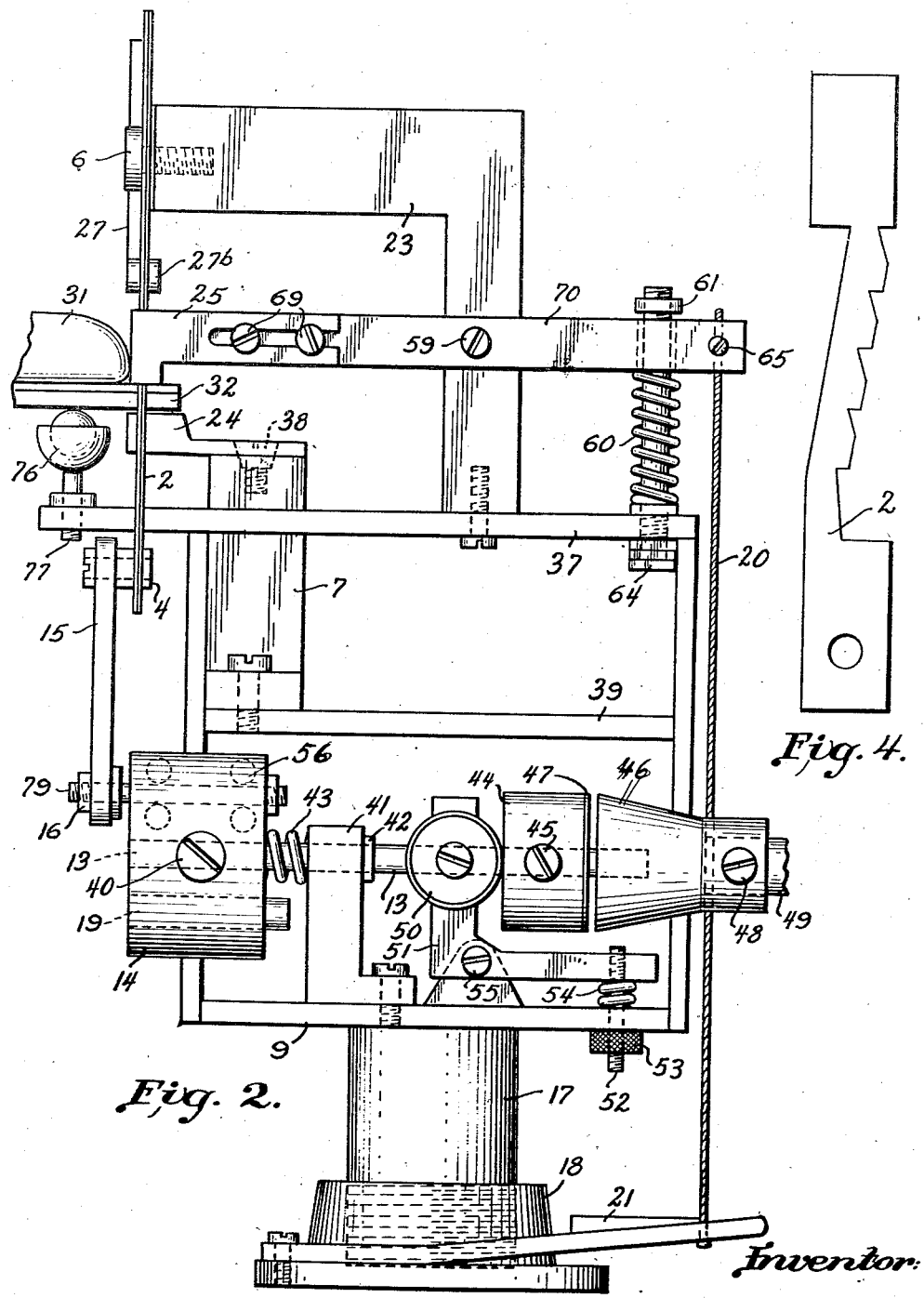
Fig. 2 is a front view of the machine.
Fig. 4 is a cutting blade.

The trimming of rubber soles is best accomplished by using blade 2 of Fig. 1, which has a knife edge 2A for engaging the work; for leather and cord soles a blade with teeth as shown in Fig. 4, produces faster cutting.

When the blade 2 in Fig. 1 has reached its highest position and starts down, it starts its draw cut against sole 32 of shoe 31 which is held in place between ratchet support plate 24 and presser foot 25. As the blade descends it advances in the direction of the cut being made because of the sloping relation that the cutting edge of the blade 2A, bears to the perpendicular movement of the blade. The narrow section of the blade 2B, reaches the space between support plate 24 and presser foot 25 when it has attained its highest position, and the work which being fed against the blade by hand pressure of the machine operator, will normally be moved forward during the ascending movement of the blade just preceding the downward cutting movement thereof, which upward movement causes a receding movement of the blade due to the inclination of the edge away from the work; thus allowing feeding.

When the blade starts on its cutting stroke after attaining its highest position, the thin and narrow section of the blade enters the cut and on the down movement advances in the cut. The ratchet like teeth which hold the work prevent same from slipping away.

The blade moves in a true vertical path because of roller 6 and roller 5 against which the blade 2 is held in continual contact during the action of the machine; this is done by spring 28 assisted by link 29 and bolt 30. These members cooperate to allow movement of the spring conforming to maintain a constant urge to contact with the said rollers of the blade and its carrier in all positions of action.

The action which I am about to describe, in the alternate construction shown in Figure 3, is particularly useful when used in cutting thin sheet and soft materials and because of the simplicity of action has a place in the field of low cost and rapid working jig saw machines. In Fig. 3 the blade 2 has attained its highest position and the blades in dotted outline show the positions they take on the quarter turns of the drive wheel 14 which turns anti-clockwise. In this figure the blade attaches with nut 16 to the drive wheel 14, and the dotted lines to the right of blade 2 show the blade advance.

In recapitulation, Figures 1, 2, and 3, have in common and illustrate the intermittent forward advance of the cutting edge of the blade in the cut being made and the spring control for maintaining the rear edges of their blades in guide relation with their supports for resisting the pressure exerted against them by the feeding operation. Although Figs. 1 and 3 illustrate different blade movements and employ slightly different shaped blades the results are the same. In the Figs. 1 and 4 the specific shape of the blade causes the desired objective, the intermittent blade advance in the work, while in Fig. 3 the said advance is caused by the machine action.

The spring control of the blade operates equally well in both actions Figs. 1 and 3 to create a quietly operating machine at high speeds. Inas-much as these two features are new they are shown in two different actions in order that a limitation to a specific structure might not be implied.

In order to trim the sole and heel of crepe rubber and other soles on sport shoes, the varying thicknesses of the bottoms of each shoe demand a special procedure when trimming with a draw stroke of the knife. It is essential that the supporting plate 24 and presser foot 25 hold the sole 32 with just enough pressure and not too much to prevent feeding of the work. Therefore the pedal 21 is provided under the right foot of the operator as he stands in front of Fig. 2, and he controls the position of the presser foot to accomplish the holding of any thickness of sole or heel by the skillful use of pressure on the pedal; the connections are as follows:

Cord 20 connects pedal 21 and lever 70 at screw eye 65 and lever 70 pivots around screw 59 which seats in rigid block 23. Presser foot 25 is secured to lever 70 with screws 69 and by the use of these screws the presser foot may be advanced toward the work until the horizontal edge of the presser foot, Fig. 2, contacts the edge of the shoe upper 31 at any desired position of sole overhang past the upper of the shoe. Thus the operator when feeding the work against the blade, maintains the upper in constant contact with the presser foot and a uniform sole extension results to the extent desired.

Bolt 64 seats in apron 37 in rigid adjustment and extends upward through a large hole in lever 70; nut 61 when screwed down compresses spring 60 which encircles bolt 64. Thus by turning nut 61 the operator may secure any desired clearance between presser foot 25 and support plate 24 that he may desire. This is valuable when all the work being run is of the same thickness; a near tight clearance for most work is best but not too tight for that would retard feeding the work.

The teeth on both members 24 and 25 it will be noted serve somewhat like a ratchet in that their shape insure that the work movement can be only in the direction of the feed, and that the intermittent forward movement of the blade cannot push the work out of cutting engagement with the blade because of the gripping effect exerted on the work by the said teeth.

The blade is under lateral guide both below and above the work for it passes through a slot in support plate 24 which fits it in near tight relation and is contacted above the work on one side by the presser foot 25, and on the other side by member 27b (Fig. 2).

The support plate 24 besides guiding the blade also cooperates with the blade of Fig. 4 as follows. The horizontal cutting edge of each tooth is positioned at right angles to the length of the blade and a chopping action occurs as the blade passes the support. The perpendicular edges of each tooth of the blade has a knife edge which operates to smooth up any roughness left by the chopping.

As previously stated in these pages the factories use the Rough Rounder in modern shoe making practice; this machine chisels off the excess over hang and leaves a roughness at the intersections of the chisel cuts in the work.

The blade 4 of this present invention provides a series of chisels tied together by a knife cutting edge which effectually smooths up any marks or scars in the cut made which might in old practice be left by the teeth of a saw or by the cutting blade of a Rough Rounder.

Thus combining in one tool a rapid cutter and smoother which might be termed a chiseling knife, for it combines the draw action of a knife with a chisel action in cooperation with the edge of support plate 24 which the tool passes in contact relation.

The work support 76 is a ball mounted in a socket attached to bolt 77 which seats in operating table 37 with means enabling adjustment of height. The height of this ball will determine the angle that the cut made by the blade shall bear to the tread surface of the sole.

When trimming the inside edge of the shank section of the sole the operator by raising the presser foot as previously explained by the use of pedal 21, may cut under and trim at an angle and gain closer entry of the cut toward the shoe. This is done by holding the top edge of the work against the lower edge of the raised presser foot while at the same time riding the tread surface of the sole on work support ball 76.

The drive wheel 14 encloses the main attaching parts which make up the drive wheel assembly, and the periphery of the wheel is in true circle around the drive shaft; thus a minimum of air resistance is encountered at high speed. This taken in connection with a skillfully balanced crank shaft accurately balanced by weights 19 enclosed in the drive wheel 14, insures a smooth running drive without vibration.

The crank shaft 79 to which link 15 is attached by nut 16, extends through the ball bearing assembly 56 which is housed in the drive wheel. It is essential that the crank shaft be journaled in ball bearings for at high speeds such bearings clearly excel.

An important part of the action of this machine is spring 28 which as before explained connects the blade carrier and bolt 30 on upright 10; besides insuring true vertical motion the spring also serves to stabilize the action of the drive and promotes quietness of operation and maintains the back of the blade in continual contact with roller 6. Previously machines of this class either did not have support for the top portions of the blade against the thrust of feeding the work or else if they did they were without means producing an intermittent forward movement of the blade in the cut being made, or if such machine possessed these two features it was without mechanical sufficiency enabling a long sweep of the blade to thereby speed up the work. These three objectives are obtained in this machine.

Having described my inventions and indicated one form of its application, it is understood that other forms may successfully employ the principles involved herein; therefore I do not wish to be limited to the specific devices shown herein but rather seek protection within the scope of the following claims.

Having described my invention what I claim and desire to secure by Letters Patent is:

1. The combination in a trimming machine, of a blade with a lateral edge mounted for trimming action, a support for the work having a guideway for the blade which also assists the blade in severing the excess overhang of a shoe sole when the blade passes an edge of the said support adjoining the said guideway, means intermittently advancing the edge of the blade in the direction of the cut being made, and means for preventing the said intermittent advance of the blade from pushing the work out of effective engagement with the blade.

2. The combination in a trimming machine for cutting soles, of a longitudinal blade mounted for cutting action, means advancing the cutting edge of the blade into a sole intermittently in the direction of the cut being made, a roller continually contacting the rear edge of the blade in position to resist the pressure of a sole fed there against, and a guard for contacting the shoe upper in position to protect the upper from blade damage liable when the shank of the shoe is being trimmed.

3. The combination in a shoe sole trimming machine of an oscillating blade with a lateral edge, means causing an intermittent forward movement of the blade in the direction of the cut as the blade operates, means providing resistance for the blade against the pressure of the feeding operation comprising a support for the rear edge of the blade past which the moving blade operates and makes contact in all positions of the blade movements, and a cooperating edge abutting one side of the blade in position to guide and assist the blade in severing the excess overhang of a shoe sole.

4. In a shoe sole trimming machine, in combination, a sole support, a longitudinal blade with a lateral cutting edge, means advancing the said edge intermittently into the sole in the direction of the cut, means for supporting the blade to resist the pressure of feeding the work, a cooperating edge contacting one side of the blade in position to assist the cutting edge of the blade in severing the excess overhang of the sole, and means for gauging the space occupied by the sole on the sole support to enable varying sole thicknesses to be held in position for free turning and feeding movement over the said support and against the blade.

5. The combination in a cutting machine, of a longitudinal blade with a lateral cutting edge, means mounting the blade for cutting action, means advancing the body of the blade into the work intermittently in the direction of the cut being made, and a roller continually contacting the rear edge of the blade in position to resist the pressure of the work fed there against.

6. The combination in a trimming machine, of an oscillating longitudinal blade having a lateral edge for draw cut engagement with the work, a support contacting the rear edge of the blade in position to resist the pressure brought against the blade during the feeding of the work, and spring controlled means in position to exert a continual pressure to maintain the rear edge of the blade in contact with its support during all positions of the trimming blade.

7. In a machine for cutting material, in combination, a unit mounted to carry a blade in oscillating action, a blade having a longitudinal sharpened edge for draw action engagement with the work, means causing an intermittent forward movement of the cutting edge of the blade in the cut being made, a support for the rear edge of the blade in position to resist the pressure exerted against it when the work is being fed against the blade, and spring controlled means holding the said rear edge of the blade against its support in yielding contact relationship in all positions of the blade's oscillating action.

CHARLES L. FLINDT.

REFERENCES CITED

The following references are of record in the file of this patent:

UNITED STATES PATENTS

| Number | Name | Date |
|---|---|---|
| 45,009 | Alexander | Nov. 15, 1864 |
| 85,417 | Andrews | Dec. 29, 1868 |
| 134,882 | Hardenbergh | Jan. 14, 1873 |
| 336,739 | Parker | Feb. 23, 1886 |
| 400,690 | Kimball | Apr. 2, 1889 |
| 406,537 | Richmond | July 9, 1889 |
| 550,570 | Meats | Nov. 26, 1895 |
| 1,214,589 | Rasmussen | Feb. 6, 1917 |
| 1,263,414 | Hopkinson | Apr. 23, 1918 |
| 1,293,059 | Eder | Feb. 4, 1919 |
| 1,952,792 | Deslattes | Mar. 27, 1934 |
| 2,051,333 | Flindt | Aug. 18, 1936 |
| 2,215,557 | McWilliams | Sept. 24, 1940 |
| 2,257,739 | Flindt | Oct. 7, 1941 |
| 2,288,897 | Flindt | July 7, 1942 |